Nov. 20, 1934.  M. H. MARTINDELL  1,981,736
STORAGE BATTERY SEPARATOR
Filed Oct. 29, 1931  2 Sheets-Sheet 2
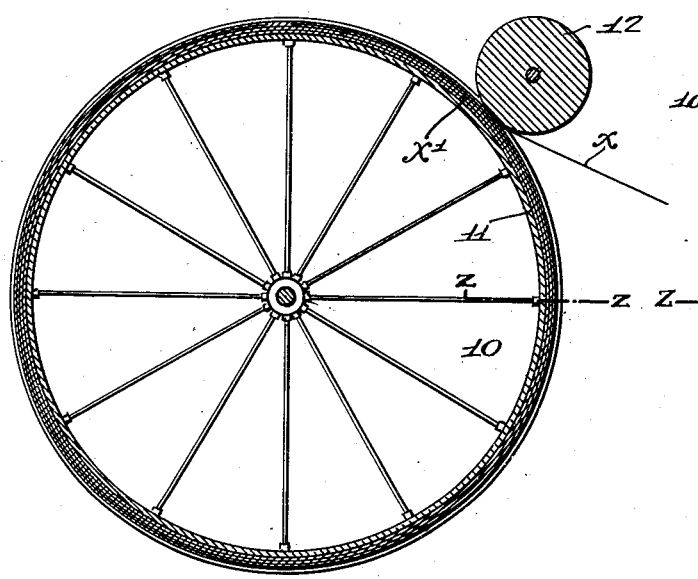
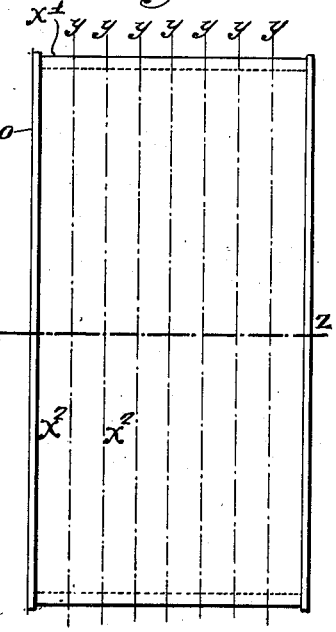
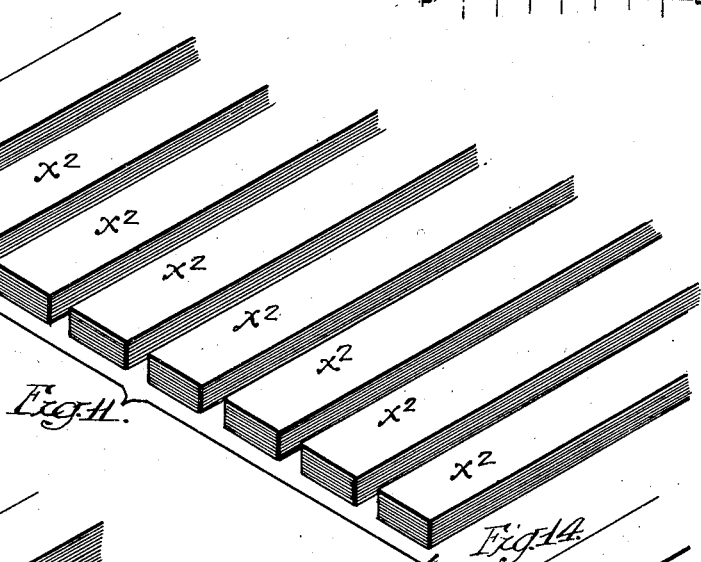
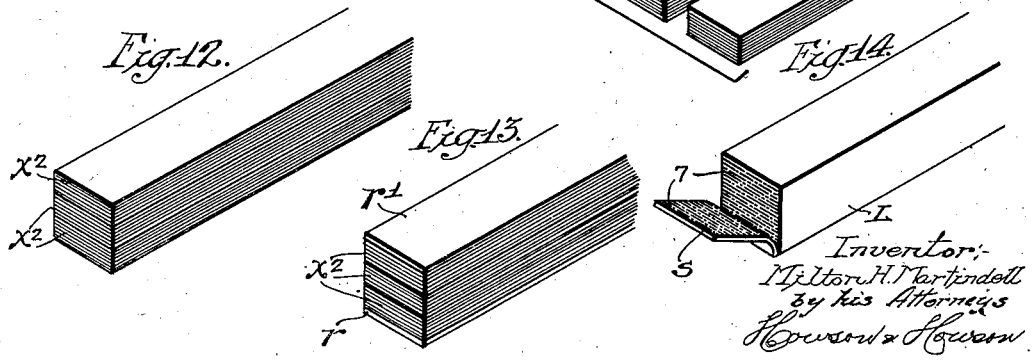
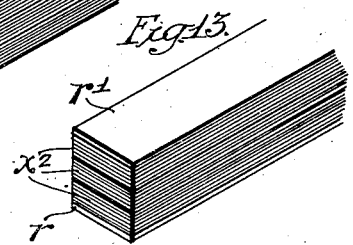
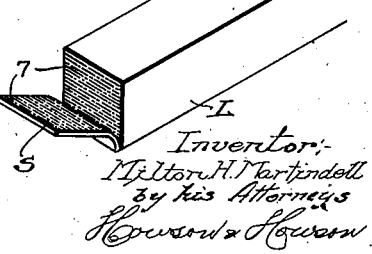
Inventor:-
Milton H. Martindell
by his Attorneys
Howson & Howson Patented Nov. 20, 1934

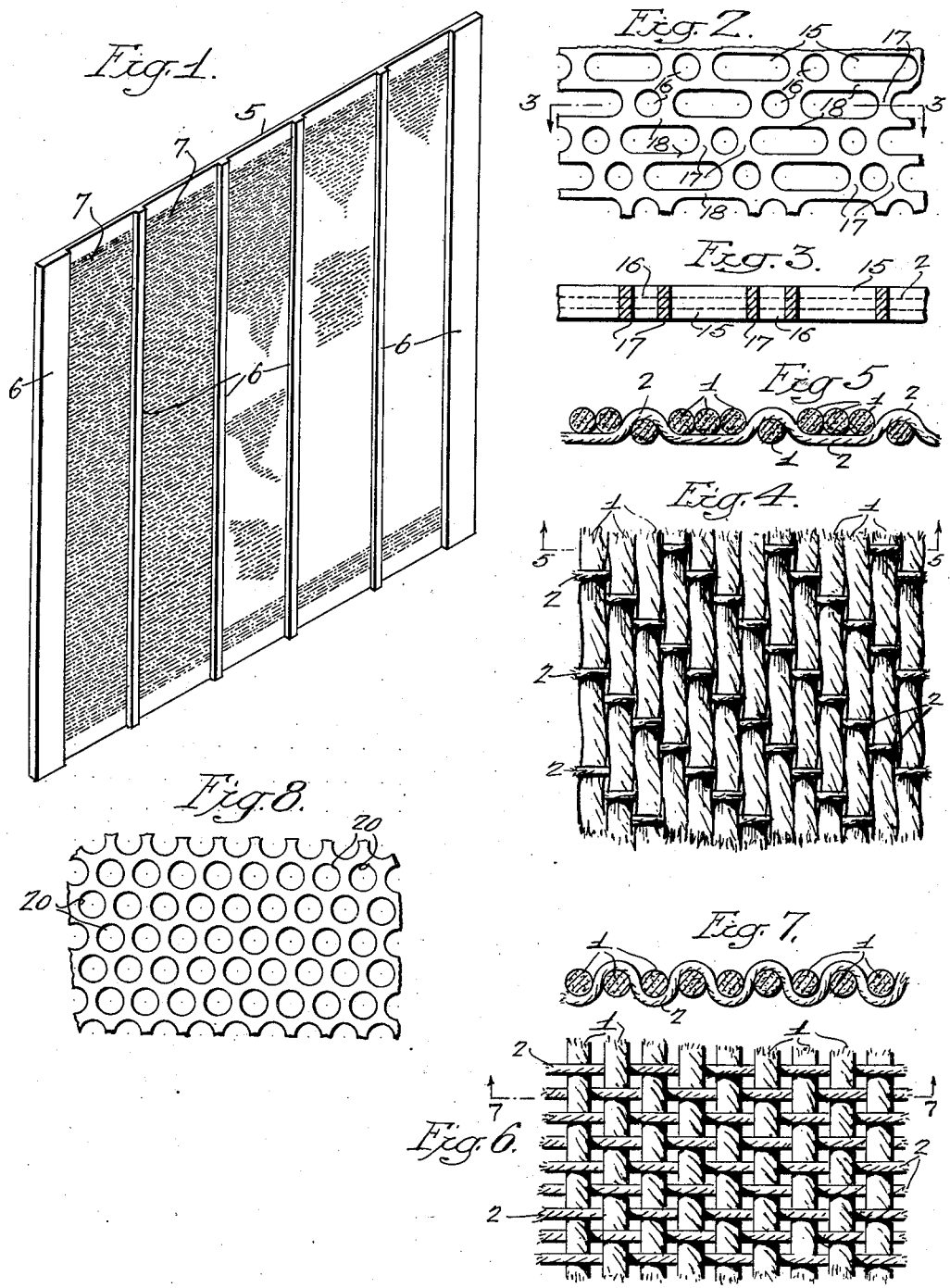

1,981,736

UNITED STATES PATENT OFFICE 1,981,736

STORAGE BATTERY SEPARATOR

Milton H. Martindell, Trenton, N. J., assignor to Jos. Stokes Rubber Co., Trenton, N. J., a corporation of New Jersey Application October 29, 1931, Serial No. 571,917

20 Claims. (Cl. 136—145)

This invention relates to what has become known in the art of storage battery manufacture as "thread-rubber separators", i. e. a separator composed of a substance insoluble in battery electrolyte and provided with porosity-producing plugs extending from face to face of the separators which are composed of material that is soluble in battery electrolyte. These porosity plugs are eaten out by the electrolyte in the battery, when the battery is assembled, leaving openings in the separator which extend from face to face of the separator, providing for the passage of electric currents between the negative and positive plates of the battery and at the same time preventing particles of the battery plate-structure from passing from one to the other of the plate compartments as defined by the separators.

Separators of this general character are disclosed in U. S. Letters Patent to T. A. Willard, No. 1,243,368 and No. 1,243,370, dated October 16, 1917.

In both of these patents, each separator is described as comprising a sheet sliced transversely from a block composed of superposed layers of cotton fabric and rubber which, prior to the slicing operation, are consolidated into a homogeneous mass having the threads of the fabric imbedded therein.

In each instance the fabric used is what is known as a one-to-one weave, such as that found in ordinary sheeting, wherein the fabric is composed of warps and wefts of substantially equal diameters. This fabric is first cut on the bias and the bias cut sheets are then laid one upon the other with the warps and wefts extending at right angles to each other but at an angle of about 45° with respect to the longitudinal center line and parallel sides of the block, in order that the slicing of the separator sheets from the block, at right angles to the said longitudinal center line and parallel side edges of the block, will be effected at an angle of substantially 45° across both the warps and the wefts, whereby each of the warps and wefts will extend completely through the separator from face to face thereof.

In the manufacture of separators under these patents, the cutting of the fabric on the bias and the building up of the block with alternating layers of rubber, as disclosed in the first of said patents, proved to be too slow for commercial purposes, hence the improvements disclosed in the second of said patents, wherein the ends of the bias cut pieces of fabric are secured together to form a continuous strip and wherein this strip is coated with rubber prior to its being laid back and forth in superposed layers to form the block.

The bias cut fabric in either case is extremely difficult to handle and control, due to its tendency to become elongated and correspondingly narrowed which produces wrinkles in the sheet longitudinally thereof when tension is applied lengthwise of the strip or sheet as the sheets or strips are being laid one layer upon another.

Another disadvantage attending the use of bias cut fabric resides in the making of what is known in the art as "pin holes" that develop in the finished separator and which are caused by the lapping of the ends of the pieces of bias cut fabric in securing the said ends of the individual sheets together to form the strip. Such pin holes are also formed by slicings being made through the places where the warps and wefts cross each other and by the above mentioned wrinkles which, when the block is being built up, layer by layer, causes the wrinkled parts of the strip to fold over or overlap adjacent parts of the strip. In each instance the sheet at such places becomes relatively thick, and as the fabric passes through the coating operation the lapped or overlapped portions of the fabric receive the coating only on the outside thereof and not within the lapped or overlapped portions. These thickened portions of the fabric, when eaten out by the electrolyte, leave relatively large holes in the separator, which must be repaired by hand before the separators are acceptable for use in a battery. In many cases the holes are of such a large size that it is impossible to make these repairs, consequently such separator sheets become a total loss to the manufacturer.

In order to avoid the above noted difficulties, the manufacturer working under the above noted patents has resorted to the use of a fabric consisting of relatively soft, loosely twisted, continuous threads or cords, mentioned as an alternative for the bias cut fabric in the second of said patents. These threads or cords are arranged in side-by-side relation to each other and extend in the direction of the length of the fabric. At predetermined intervals of about ⅝ to ¾ of an inch throughout the length of the fabric a cross or transverse thread is inserted. Each of these transverse threads passes over one and under the next of the soft, loose, longitudinally extending threads above noted.

Coating of the fabric is effected by passing it through calendering rolls which applies a coating of rubber to one side of the fabric, after which the fabric is reversed and again run through the calendering rolls to receive a similar coating on the opposite side thereof.

The theory of coating the fabric in this manner is to completely surround each of the longitudinal threads or cords with rubber so that when the threads, which form the plugs in the separator sheet, are subsequently eaten away by the battery electrolyte, each thread will leave an independent hole in the separator corresponding in size to the diameter of the thread, with each hole completely surrounded by rubber, such rubber having previously been vulcanized to form the homogeneous mass with the threads imbedded therein, as above noted.

The wide spacing of the cross threads in this cord fabric, as it has become known in the art, leaves the longitudinally extending cords in a very loose and uncontrollable condition. Consequently, when the fabric is passed through the calendering rolls the cords in many places overlap each other and in other places become packed so closely together that the individual cords are not completely covered with the rubber, only the outer surfaces of such groups of threads receiving the coating. As a result of this condition when the threads are subsequently eaten out by the battery electrolyte large pin holes and excessively long slits are formed in the separators, which materially weaken the separator structure, requiring the above noted hand repair or amounting to total loss. Such repairs and losses amount to substantially 30% of the total production. Even after repairs are made in those of the separators that are repairable the separators are weak and must be delicately handled.

The loose cord fabric furthermore, when built up in superposed layers to complete the block, forms a more or less spongy mass. In slicing the separator sheets transversely from a block of this kind it has been found in practice that the sheet must be at least .035 of an inch in thickness, which tends to decrease the porosity of the separator and to increase the electric resistance thereof.

In forming the separator sheets in accordance with the principles of the present invention the thickness of each separator sheet may be reduced to .027 of an inch, due to the block from which the sheets are cut being of a more solid nature than the block composed of the superposed layers of cord fabric. This reduction in the thickness of a separator sheet increases the porosity of the separator and decreases the electric resistance of such separator.

Another advantage resulting from the present invention resides in the fact that from a block of given length the number of separator sheets sliced therefrom is increased between 25 and 30 percent over the number of sheets it is possible to slice from a block composed of the cord fabric.

Another disadvantage attending the use of the cord fabric resides in the loosely twisted nature of the warps employed which absorb a great amount of the rubber, consequently when the threads are eaten out by the battery electrolyte the edges of the openings are ragged, and in many instances substantially closed by the rubber which has penetrated the threads, consequently reducing the porosity of the finished separator and increasing the electric resistance thereof.

Sizing of the threads as the most logical and least expensive method of overcoming the impregnation of the threads by the rubber is undesirable, because of the reaction when such sized threads are brought into contact with the battery electrolyte, the reaction being in the form of an undesirable foaming in the battery.

In order to produce a block of the desired size for a finished battery separator of given dimensions 336 layers of cord fabric are required as against 300 layers of the fabric used in accordance with the principles of the present invention for a battery separator of the same size.

The present invention primarily involves the use of a fabric composed of substantially parallel warps definitely spaced and securely maintained in predetermined lateral relation to each other by transversely extending wefts which are spaced relatively close to each other throughout the length of the fabric, whereby the overlapping of the warps in passing through the calendering rolls is eliminated, consequently eliminating the formation of the pin holes and the slits in the finished separators as above noted, such imperfections in the battery separators made in accordance with the principles of the present invention having been reduced to a maximum of less than 1% of the total production as compared with the 30% defects attending the use of the cord fabric as noted above, the low percentage of imperfections representing holes caused by unavoidable knots and other irregularities occurring in the threads.

In building up the block in accordance with the principles of the present invention the fabric is laid in superposed layers with the controlled warps running longitudinally of the block and the warps of each layer being substantially parallel to those of the next adjacent layer.

One advantage attending the use of the fabric noted resides in the fact that when using a one-to-one weave each of the warp threads, due to the control as effected by the closely spaced weft threads, will be completely surrounded by the rubber thereby forming the desired independent openings in the finished battery separator.

Another feature attending the use of this fabric resides in the ability to control the positions of the adjacently disposed warps, whereby any desired number of the warps may be grouped together in a flat relation to form slots of predetermined length in the finished separator, each slot having a width substantially equal to one warp diameter and a length equal to the sum of the diameters of the warps so grouped. For all practical purposes a twill fabric having a three-to-one weave has been found to be practical and highly efficient. In such fabric each weft thread passes over one warp and under the next three warps, repeating this sequence across the width of the fabric. Thus, in the finished separator when the threads are eaten out by the battery electrolyte where each layer of fabric had been there remains a line of openings comprising a substantially circular opening having a diameter substantially equal to that of the single thread over which the weft passed, alternating with a slot having a width substantially equal to one warp diameter and a length substantially equal to three warp diameters. Obviously, by changing the weave any number of warps may be grouped together to form slots of any desired length, but which will have a width substantially equal to but one warp diameter.

Another feature of the present invention is the use of tightly twisted warps which will resist impregnation by the rubber coating, whereby the rubber is caused to remain on the outside of each of the threads, thus producing clean cut openings of uniform size in the finished separator which increases the porosity of the separator, decreases the electrical resistance thereof and strengthens the separator to such an extent that its thickness may be reduced to that above noted.

Another feature of the present invention resides in the use of relatively fine, loosely twisted wefts, that is, a weft having a diameter substantially less than the thickness of the finished separator, for example .010 of an inch or less in diameter as compared to .027 of an inch representing the thickness of the separator, whereby the loosely twisted wefts will absorb a maximum amount of rubber and whereby a weft lying intermediate the opposite faces of the battery separator will be covered on one or both sides by a sufficient amount of rubber to prevent the formation of a slit when the thread is subsequently eaten out by the battery electrolyte. In view of the fact that these wefts are not intended to form openings passing from one to the other of the opposite faces of the separator it is desirable that they absorb as much of the rubber as possible so that the separator will not be weakened to any material extent when the fibers of the weft threads are eaten out by the battery electrolyte.

Another feature of the present invention resides in the use of warps and wefts which are free from sizing of any kind, whereby foaming in the battery is practically eliminated.

Referring now to the accompanying drawings:

Fig. 1 is a perspective view of separator made in accordance with the principles of the present invention, using a three-to-one twill fabric, as above noted:

Fig. 2 is a fragmentary face view of the separator showing the openings left therein after the threads have been eaten out by the battery electrolyte;

Fig. 3 is a sectional view taken on the line 3—3, Fig. 2;

Fig. 4 is a diagrammatic face view of a piece of three-to-one twill fabric employed in making the separator shown in Fig. 1;

Fig. 5 is a weftwise sectional view taken on the line 5—5, Fig. 4;

Fig. 6 illustrates a piece of fabric employing the one-to-one weave;

Fig. 7 is a weftwise sectional view taken on the line 7—7, Fig. 6;

Fig. 8 is a fragmentary view of a separator showing the arrangement of openings when using the fabric illustrated in Figs. 6 and 7;

Fig. 9 diagrammatically illustrates the manner of laying the fabric in superposed layers;

Fig. 10 is a diagrammatic front elevation of the apparatus shown in Fig. 9 and illustrating the manner in which the cylindrical slab composed of superposed layers of fabric is cut into strips of predetermined size;

Fig. 11 is a diagrammatic perspective view illustrating a plurality of strips cut from the slab produced by the apparatus shown in Figs. 9 and 10;

Fig. 12 illustrates a plurality of strips laid one upon the other to form a block of predetermined thickness;

Fig. 13 is a view similar to Fig. 12, and illustrating a subsequent step in the formation of the block; and Fig. 14 is a diagrammatic perspective view illustrating a separator sheet being sliced from the finished block.

In producing separators in accordance with the principles of the present invention, a bolt or roll of fabric of the nature illustrated in Figs. 4 or 6 is first run through an ordinary calendering machine which applies a coating of rubber to one face of the fabric, after which the fabric is reversed, face for face, and run through the calendering rolls a second time in order to coat the said second side of the fabric with rubber.

The fabric comprises a plurality of warp threads 1, 1 which are arranged in substantially parallel relation to each other in a direction extending longitudinally of the fabric as the fabric is passed through the calendering rolls above noted. These warps are maintained in any predetermined lateral relation to each other by means of wefts 2, 2 which are spaced relatively close to each other throughout the length of the fabric. For example, the wefts are spaced apart a distance substantially equal to twice the diameter of the weft threads.

In actual practice a fabric has been satisfactorily used which consisted of 42 weft threads per inch, each weft thread being of a .01" diameter; and 65 warp threads per inch each comprising two threads of substantially .01" diameter each. In accordance with the principles of this invention the weft threads are of a relatively soft, loosely twisted nature while the warp threads are of a relatively tight twisted nature.

When using a twill fabric, such as that diagrammatically illustrated in Figs. 4 and 5, the warps 1 are maintained in groups of three, a weft thread 2 passing alternately under such a group of three warps and over the next single warp which separates the single warp from the group.

In using a fabric such as that diagrammatically illustrated in Figs. 6 and 7, each warp thread 1 is separated from the next adjacent warp thread a distance corresponding substantially to the thickness of the weft thread which passes over one warp and under the next warp as shown.

The spacing or grouping of the warps in this manner and the fact that the warps are maintained in this general relation to each other throughout the length of the fabric by the closely spaced wefts permits the rubber to pass completely around each warp or each group of warps, as the case may be, as the fabric is passed through the calendering rolls in the manner above noted.

After coating, one end of the fabric is secured in any desired manner to the peripheral surface 11 of a drum or big wheel 10 having, for example a diameter of approximately eight feet and a face sufficiently wide to receive fabric fifty inches wide. The drum 10 is then rotated in a manner to wind the fabric $x$ in superposed layers on the peripheral face 11 thereof to form a cylindrical slab $x^1$, as illustrated in Fig. 9, the superposed layers being pressed one upon the other during the winding thereof on the drum 10 by means of a pressure roll 12. Due to the adhesive nature of the rubber which at this stage of the operation is unvulcanized and of a very sticky nature, the pressure of the roll 12 causes the superposed layers of coated fabric to adhere one to the other. After a predetermined number of layers are formed, the cylindrical slab $x^1$ formed by the superposed layers of fabric is slit circumferentially at a plurality of laterally spaced places, as indicated at $y$, $y$ in Fig. 10, and transversely along the line indicated at $z, z$ in Figs. 9 and 10, to produce eight strips $x^2$, $x^2$ each substantially 6¼" wide and approximately 27' long. The strips $x^2$ produced by the slitting of the cylinders $x^1$ in the manner noted are then laid out flat. A number of strips $x^2$, for example three of said strips, are then superposed one upon the other in the manner illustrated in Fig. 12, after which a sheet of rubber $r$ is applied to one face of the assembled strips and a corresponding sheet of rubber $r^1$ is applied to the opposite side of said assemblage.

The assemblage shown in Fig. 13 is then placed under pressure and partially vulcanized, which causes the layers $x$ of fabric comprising each strip $x^2$ and the adjacent faces of the superposed strips $x^2$, $x^2$ and sheets of rubber $r$ and $r^1$ to become consolidated into a homogeneous mass in the form of a block or log L having the threads of the fabric imbedded therein.

The partially vulcanized block or log L is then placed in a suitable slicing machine from which the separate sheets S are successively sliced in a direction transversely of the block or log L.

After slicing, the sheets S are placed in a suitable mold having grooves adapted to receive relatively narrow strips of rubber in superposed relation to the sheet S, for the purpose of producing ribs on one face of the separator. The molds with assembled separators therein are then placed in a vulcanizer, in which the vulcanization of the rubber in each sheet is completed.

The separators are then removed from the mold and trimmed to proper size, producing the finished separator illustrated in Fig 1, wherein the sheet S forms the body 5 of the separator, from one side of which extends side and intermediate ribs 6, 6 produced by the strips of rubber applied to the sheet S in the finishing mold (not shown).

As a result of this operation each separator is composed of a body of rubber, which is insoluble in the battery electrolyte, and extending from face to face of the body 5 of the separator are the substantially uniformly spaced porosity-forming plugs 7 which are composed of warp threads 1 of the superposed layers of fabric and which are soluble in the battery electrolyte.

After the separators are assembled in a battery and the battery filled with electrolyte the electrolyte attacks and eats away the plugs 7 in the respective separators, leaving openings in place thereof which, as shown in Figs. 2 and 3, comprises series of flat, elongated slots 15 alternating across the separator with small, substantially circular openings 16, the alternating slots and circular openings being separated by vertical walls of rubber 17, 17, the horizontally extending rows of openings 15—16 being separated by horizontally disposed walls of rubber 18, 18.

When using the fabric such as that illustrated in Figs. 6 and 7 a plurality of horizontally disposed rows of substantially circular openings 20 are formed in the finished separator as clearly shown in Fig. 8.

Battery separators made in accordance with the principles of this invention, as above described, have been found to increase the general efficiency of this type of separator substantially 50% over that of the separators described above as constituting the prior art.

While specific dimensions of threads, number of threads per inch, width of fabric, size of log, and number of layers required to form a log, and the thickness of the separator sheet cut from the log, have been noted in the specification as examples for the purpose of illustration, it will be understood that these measurements and quantities may vary in accordance with the result desired.

While but two weaves have been disclosed, obviously any weave of the general character noted may be employed to produce groups of warp threads for the production of slots or openings of any desired size.

I claim:

1. A storage battery separator comprising a sheet composed of a relatively thin transverse section of an elongated substantially right parallel sided block consisting of superposed bonded layers of fabric at least some of which are composed of substantially rectilinear parallel warps extending longitudinally of the block and substantially parallel to the side edges thereof and held in predetermined lateral relation to each other by transversely extending undulated wefts spaced relatively close to each other throughout the length of the block, said transverse section being substantially at right angles to the longitudinal axis of the block.

2. A storage battery separator comprising a sheet composed of a relatively thin transverse section of an elongated substantially right parallel sided block consisting of superposed bonded layers of fabric composed of substantially rectilinear parallel warps extending longitudinally of the block and substantially parallel to the side edges thereof and held in predetermined lateral relation to each other by transversely extending undulating wefts spaced relatively close to each other throughout the length of the block, said transverse section being substantially at right angles to the longitudinal axis of the block.

3. A storage battery separator comprising a sheet composed of a relatively thin transverse section of an elongated substantially right parallel sided block consisting of superposed bonded layers of fabric composed of substantially rectilinear parallel tightly twisted warps extending longitudinally of the block and substantially parallel to the side edges thereof and held in predetermined lateral relation to each other by transversely extending undulated wefts spaced relatively close to each other throughout the length of the block, said transverse section being substantially at right angles to the longitudinal axis of the block.

4. A storage battery separator comprising a sheet composed of a relatively thin transverse section of an elongated substantially right parallel sided block consisting of superposed bonded layers of fabric composed of substantially rectilinear parallel relatively tightly twisted warps extending longitudinally of the block and substantially parallel to the side edges thereof and held in predetermined lateral relation to each other by transversely extending relatively loosely twisted undulated wefts spaced relatively close to each other throughout the length of the block, said transverse section being substantially at right angles to the longitudinal axis of the block.

5. A storage battery separator comprising a sheet composed of a relatively thin transverse section of an elongated substantially right parallel sided block consisting of superposed bonded layers of fabric composed of substantially rectilinear parallel relatively coarse warps extending longitudinally of the block and substantially parallel to the side edges thereof and held in predetermined lateral relation to each other by transversely extending relatively fine undulated wefts spaced relatively close to each other throughout the length of the block, said transverse section being substantially at right angles to the longitudinal axis of the block.

6. A storage battery separator comprising a sheet composed of a relatively thin transverse section of an elongated substantially right parallel sided block consisting of superposed bonded layers of fabric composed of substantially rectilinear parallel warps extending longitudinally of the block and substantially parallel to the side edges thereof and held in predetermined lateral relation to each other by transversely extending relatively fine undulated wefts spaced relatively close to each other throughout the length of the block, said transverse section being substantially at right angles to the longitudinal axis of the block and the thickness of the sheet being substantially greater than the diameter of the wefts.

7. A storage battery separator comprising a sheet composed of a relatively thin transverse section of an elongated substantially right parallel sided block consisting of superposed bonded layers of fabric composed of substantially rectilinear parallel relatively coarse warps extending longitudinally of the block and substantially parallel to the side edges thereof and held in predetermined lateral relation to each other by transversely extending relatively fine undulated wefts spaced relatively close to each other throughout the length of the block, said transverse section being substantially at right angles to the longitudinal axis of the block and the thickness of the separator sheet being greater than the diameter of the wefts.

8. A storage battery separator comprising a sheet composed of a relatively thin transverse section of an elongated substantially right parallel sided block consisting of superposed bonded layers of fabric composed of substantially rectilinear parallel tightly twisted relatively coarse warps extending longitudinally of the block and substantially parallel to the side edges thereof and held in predetermined lateral relation to each other by transversely extending loosely twisted relatively fine undulated wefts spaced relatively close to each other throughout the length of the block, said transverse section being substantially at right angles to the longitudinal axis of the block and the thickness of the separator sheet being greater than the diameter of the wefts.

9. A storage battery separator comprising a sheet composed of a relatively thin transverse section of an elongated substantially right parallel sided block consisting of superposed bonded layers of fabric composed of substantially rectilinear parallel warps extending longitudinally of the block and substantially parallel to the side edges thereof and held in predetermined lateral relation to each other including elongated groups by transversely extending undulated wefts spaced relatively close to each other throughout the length of the block, said transverse section being substantially at right angles to the longitudinal axis of the block.

10. An article of manufacture for use in producing storage battery separators, comprising an elongated substantially right parallel sided block consisting at least in part of superposed bonded layers of fabric composed of substantially rectilinear parallel warps extending longitudinally of the block and substantially parallel to the side edges thereof and held in predetermined lateral relation to each other by transversely extending undulated wefts spaced relatively close to each other throughout the length of the block, said block being adapted for slicing into relatively thin transverse sections substantially at right angles to the longitudinal axis of the block.

11. An article of manufacture for use in producing storage battery separators, comprising an elongated substantially right parallel sided block consisting of superposed bonded layers of fabric some of which at least are composed of substantially rectilinear parallel warps extending longitudinally of the block and substantially parallel to the side edges thereof and held in predetermined lateral relation to each other by transversely extending undulated wefts spaced relatively close to each other throughout the length of the block, said block being adapted for slicing into relatively thin transverse sections substantially at right angles to the longitudinal axis of the block.

12. An article of manufacture for use in producing storage battery separators, comprising an elongated substantially right parallel sided block consisting of superposed bonded layers of fabric composed of substantially rectilinear parallel warps extending longitudinally of the block and substantially parallel to the side edges thereof and held in predetermined lateral relation to each other by transversely extending undulated wefts spaced relatively close to each other throughout the length of the block, said block being adapted for slicing into relatively thin transverse sections substantially at right angles to the longitudinal axis of the block.

13. An article of manufacture for use in producing storage battery separators, comprising an elongated substantially right parallel sided block consisting of superposed bonded layers of fabric composed of substantially rectilinear parallel tightly twisted warps extending longitudinally of the block and substantially parallel to the side edges thereof and held in predetermined lateral relation to each other by transversely extending undulated wefts spaced relatively close to each other throughout the length of the block, said block being adapted for slicing into relatively thin transverse sections substantially at right angles to the longitudinal axis of the block.

14. An article of manufacture for use in producing storage battery separators, comprising an elongated substantially right parallel sided block consisting of superposed bonded layers of fabric composed of substantially parallel relatively tightly twisted warps extending longitudinally of the block and held in predetermined lateral relation to each other by transversely extending relatively loosely twisted wefts spaced relatively close to each other throughout the length of the block, said block being adapted for slicing into relatively thin transverse sections substantially at right angles to the longitudinal axis of the block.

15. An article of manufacture for use in producing storage battery separators, comprising an elongated substantially right parallel sided block consisting of superposed bonded layers of fabric composed of substantially parallel relatively coarse warps extending longitudinally of the block and held in predetermined lateral relation to each other by transversely extending relatively fine wefts spaced relatively close to each other throughout the length of the block, said block being adapted for slicing into relatively thin transverse sections substantially at right angles to the longitudinal axis of the block.

16. An article of manufacture for use in producing storage battery separators, comprising an elongated substantially right parallel sided block consisting of superposed bonded layers of fabric composed of substantially parallel tightly twisted relatively coarse warps extending longitudinally of the block and held in predetermined lateral relation to each other by transversely extending loosely twisted relatively fine wefts spaced relatively close to each other throughout the length of the block, said block being adapted for slicing into relatively thin transverse sections substantially at right angles to the longitudinal axis of the block.

17. An article of manufacture for use in producing storage battery separators, comprising an elongated substantially right parallel sided block consisting of superposed bonded layers of fabric composed of substantially rectilinear parallel warps extending longitudinally of the block and substantially parallel to the side edges thereof and held in predetermined lateral relation to each other including elongated groups by transversely extending undulated wefts spaced relatively close to each other throughout the length of the block, said block being adapted for slicing into relatively thin transverse sections substantially at right angles to the longitudinal axis of the block.

18. An article of manufacture for use in producing storage battery separators, comprising an elongated substantially right parallel sided block consisting of superposed bonded layers of twill fabric arranged with the warps thereof extending longitudinally of the block and substantially parallel to the side edges thereof, said block being adapted for slicing into relatively thin transverse sections substantially at right angles to the longitudinal axis of the block.

19. An article of manufacture for use in producing storage battery separators, comprising an elongated substantially right parallel sided block consisting at least in part of superposed bonded layers of twill fabric arranged with the warps thereof extending longitudinally of the block and substantially parallel to the side edges thereof, said block being adapted for slicing into relatively thin transverse sections substantially at right angles to the longitudinal axis of the block.

20. An article of manufacture for use in producing storage battery separators, comprising an elongated substantially right parallel sided block consisting of superposed bonded layers of fabric at least some of which are twill fabric arranged with the warps thereof extending longitudinally of the block and substantially parallel to the side edges thereof, said block being adapted for slicing into relatively thin transverse sections substantially at right angles to the longitudinal axis of the block.

MILTON H. MARTINDELL.